US012183291B2

(12) United States Patent

Kwon et al.

(10) Patent No.: US 12,183,291 B2

(45) Date of Patent: Dec. 31, 2024

(54) PIXEL DRIVING CIRCUIT FOR DISPLAY PANEL

(71) Applicant: LX Semicon Co., Ltd., Daejeon (KR)

(72) Inventors: Yong Jung Kwon, Daejeon (KR); Sang Min Lee, Daejeon (KR); Jong Hwi Park, Daejeon (KR); Jung Bae Yun, Daejeon (KR)

(73) Assignee: LX Semicon Co., Ltd., Daejeon (KR)

( * ) Notice: Subject to any disclaimer, the term of this patent is extended or adjusted under 35 U.S.C. 154(b) by 0 days.

(21) Appl. No.: 18/078,853

(22) Filed: Dec. 9, 2022

(65) Prior Publication Data

US 2023/0103512 A1 Apr. 6, 2023

Related U.S. Application Data

(63) Continuation of application No. 17/523,809, filed on Nov. 10, 2021, now Pat. No. 11,532,284.

(30) Foreign Application Priority Data

Nov. 19, 2020 (KR) ........................ 10-2020-0155275

(51) Int. Cl.

*G09G 3/3291* (2016.01)

*G09G 5/00* (2006.01)

(52) U.S. Cl.

CPC ........... *G09G 3/3291* (2013.01); *G09G 5/008* (2013.01); *G09G 2310/027* (2013.01); *G09G 2320/0233* (2013.01); *G09G 2320/0257* (2013.01); *G09G 2320/0626* (2013.01); *G09G 2320/0673* (2013.01); *G09G 2330/04* (2013.01); *G09G 2360/16* (2013.01)

(58) Field of Classification Search

CPC .......... G09G 3/2092–2096; G09G 3/32–3291; G09G 2320/0626–0653; G09G 2360/16; G09G 5/008

See application file for complete search history.

(56) References Cited

U.S. PATENT DOCUMENTS

| | | | | |
|---|---|---|---|---|
| 6,989,823 | B1 * | 1/2006 | Lasneski ................ | G09G 5/005 345/545 |
| 9,311,857 | B2 * | 4/2016 | Seong .................. | G09G 3/3225 |
| 10,163,415 | B2 * | 12/2018 | Jeon ...................... | G09G 3/3648 |
| 10,453,406 | B2 * | 10/2019 | Jang ...................... | G09G 3/3611 |
| 11,283,449 | B2 * | 3/2022 | Pyun ..................... | G09G 3/3233 |
| 11,335,252 | B2 * | 5/2022 | Park ......................... | G09G 3/32 |
| 11,594,186 | B2 * | 2/2023 | Jung ..................... | G09G 3/3275 |
| 2005/0057580 | A1 | 3/2005 | Yamano et al. | |
| 2006/0077199 | A1 * | 4/2006 | Liao ..................... | G09G 3/2007 345/211 |

(Continued)

FOREIGN PATENT DOCUMENTS

| | | | |
|---|---|---|---|
| KR | 10-2004-0039408 | A | 5/2004 |
| KR | 10-2017-0078435 | A | 7/2017 |

*Primary Examiner* — Patrick F Marinelli

(74) *Attorney, Agent, or Firm* — ROTHWELL, FIGG, ERNST & MANBECK, P.C.

(57) ABSTRACT

The present embodiment relates to a technology for driving a display device, and provides a technology in which a pixel driving device determines whether or not an overcurrent flows through a driving voltage line, and, if it is determined that an overcurrent flows therethrough, controls pixel data or an analog voltage output to a pixel so as to reduce a driving current.

20 Claims, 7 Drawing Sheets

(56) References Cited

U.S. PATENT DOCUMENTS

| | | | | |
|---|---|---|---|---|
| 2007/0070008 A1* | 3/2007 | Shin | G09G 3/3648 | 345/89 |
| 2013/0050298 A1* | 2/2013 | Su | G09G 3/3611 | 345/691 |
| 2014/0152717 A1* | 6/2014 | Seong | G09G 3/3225 | 345/76 |
| 2015/0187315 A1* | 7/2015 | Park | G09G 3/3685 | 345/99 |
| 2017/0206848 A1* | 7/2017 | Jeon | G09G 3/2007 | |
| 2018/0190218 A1* | 7/2018 | Jang | G09G 3/2096 | |
| 2021/0183291 A1* | 6/2021 | Jeong | G09G 3/20 | |
| 2021/0281263 A1* | 9/2021 | Pyun | G09G 3/2096 | |
| 2022/0180814 A1* | 6/2022 | Jung | G09G 5/006 | |
| 2023/0103512 A1* | 4/2023 | Kwon | G09G 3/3291 | 345/55 |

* cited by examiner

PIXEL DRIVING CIRCUIT FOR DISPLAY PANEL

CROSS REFERENCE TO RELATED APPLICATION

This application is a continuation application of U.S. patent application Ser. No. 17/523,809 filed on Nov. 10, 2021, which claims priority from Republic of Korea Patent Application No. 10-2020-0155275, filed on Nov. 19, 2020, all of which are hereby incorporated by reference in their entirety.

BACKGROUND

1. Field of Technology

The present embodiment relates to a technology for driving pixels arranged on a display panel.

2. Description of the Prior Art

A display device may include a display panel and a pixel driving device. The display panel may have a plurality of pixels arranged thereon, and the brightness of each pixel may be controlled according to a driving current supplied from the pixel driving device. For example, a high driving current must be supplied to the pixel in order to control the pixel with high brightness, and a low driving current must be supplied to the pixel in order to control the pixel with low brightness. In general, the magnitude of the driving current for each pixel is determined according to a grayscale value of each pixel received by the pixel driving device.

The pixel driving device receives pixel data including a grayscale value for each pixel. In addition, the pixel driving device converts the grayscale value of the pixel data into an analog voltage, and supplies the analog voltage to each pixel. A driving transistor may be disposed in each pixel, and the magnitude of the driving current supplied to each pixel is determined according to the magnitude of the analog voltage supplied to the gate of the driving transistor. According to this process, when the pixel driving device receives pixel data including a low grayscale value, the brightness of the pixel may be controlled to be low, and when the pixel driving device receives pixel data including a high grayscale value, the brightness of the pixel may be controlled to be high.

The pixel driving device receives image data including pixel data from an external device. However, when the image data is affected by noise, the pixel data may have an abnormal grayscale value. Alternatively, when noise occurs in the internal circuit of the pixel driving device, the pixel data may have an abnormal grayscale value. If the pixel data has an abnormal grayscale value, the pixel may also emit light with abnormal brightness.

Light emission at abnormal brightness may cause a problem, especially, in high brightness light emission. In the case where light is emitted at high brightness, a high driving current is supplied to the pixels. However, if the above high driving current continues to be supplied for a predetermined time or more, heat is generated in lines to which the driving current is supplied, and some lines or devices around the same may be burned.

SUMMARY OF THE INVENTION

Against this background, the present embodiment provides a technology for preventing an excessive driving current from flowing due to noise. In another aspect, the present embodiment provides a technology for preventing the occurrence of an afterimage in a display panel due to abnormal light emission from each pixel. In another aspect, the present embodiment provides a technology for reducing the visibility of image noise caused by abnormal brightness.

In view of the foregoing, in one aspect, the present embodiment provides a pixel driving circuit that includes: a control circuit configured to change pixel data to a low-brightness grayscale value if a grayscale value of the pixel data is greater than a high-brightness reference value; a digital-to-analog converting circuit configured to convert the pixel data into an analog voltage; and an output circuit configured to output the analog voltage to the pixel to control the brightness of the pixel.

Another aspect, the present embodiment provides a pixel driving circuit including: a control circuit configured to compare grayscale values of pixels with a high-brightness reference value, and, if the grayscale values of N pixels (N is a natural number) exceed the high-brightness reference value, to switch its mode to a low-brightness mode; and an output circuit configured to output, to each pixel, a low-brightness analog voltage that causes each pixel to emit light at low brightness when the control circuit switches its mode to the low-brightness mode.

In another aspect, the present embodiment provides a pixel driving circuit including: a clock recovery circuit configured to recover a clock from an embedded clock signal, extract image data, and, if an abnormality is detected in the clock or the image data, generate a lock signal; a digital-to-analog converting circuit configured to convert pixel data included in the image data into analog voltages; an output circuit configured to output the analog voltages to pixels, thereby controlling brightness of the pixel; and a control circuit configured to change the pixel data or control the output circuit such that the output circuit outputs a low-brightness analog voltage that causes each pixel to emit light at low brightness if the lock signal is generated.

As described above, according to the present embodiment, it is possible to prevent an excessive driving current from flowing due to noise and to prevent burning in lines or devices due to the excessive driving current. In addition, according to the present embodiment, it is possible to prevent the occurrence of an afterimage in the display panel due to abnormal light emission from each pixel. Further, according to the present embodiment, it is possible to lower the visibility of image noise due to abnormal brightness.

DETAILED DESCRIPTION OF THE EXEMPLARY EMBODIMENTS

Figure 1:
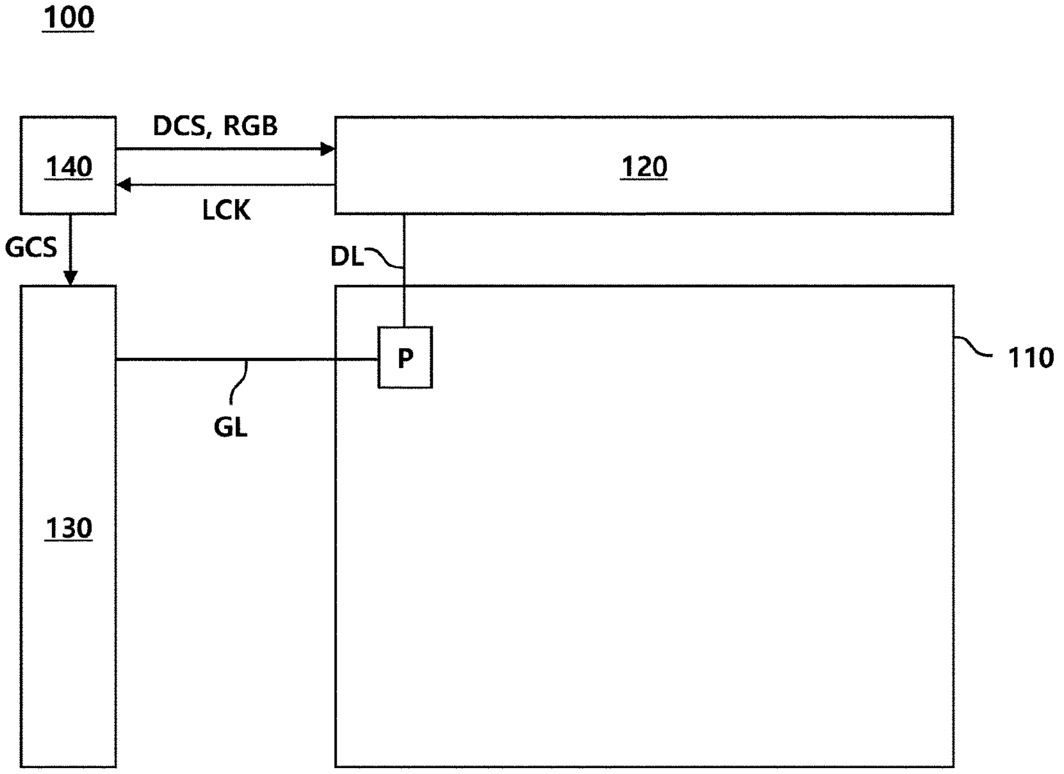
FIG. 1 is a diagram illustrating the configuration of a display device according to an embodiment.

FIG. 1 is a diagram illustrating the configuration of a display device according to an embodiment.

Referring to FIG. 1, a display device 100 may include a display panel 110, a pixel driving device 120, a gate driving device 130, a data processing device 140, and the like.

A plurality of data lines DL and a plurality of gate lines GL may be arranged on the display panel 110, and pixels P may be disposed at the intersections of the data lines DL and the gate lines GL. The display panel 110 may be a liquid crystal display panel, an organic light-emitting diode (OLED) display panel, or another type of display panel.

The pixel driving device 120, the gate driving device 130, and the data processing device 140 may be collectively referred to as a "display driving device". The pixel driving device 120 is also referred to as a "source driver", and the gate driving device 130 is also referred to as a "gate driver". In addition, the data processing device 140 is also referred to as a "timing controller".

The gate driving device 130 may supply a scan signal of a turn-on voltage or a turn-off voltage to the gate line GL. When the scan signal of a turn-on voltage is supplied to the pixel P, the pixel P is connected to the data line DL, and when the scan signal of a turn-off voltage is supplied to the pixel P, the connection between the pixel P and the data line DL is released.

The gate driving device 130 may receive a timing signal for the scan signal from the data processing device 140. The gate driving device 130 may continuously generate the scan signal and supply the same to the gate line GL while the data processing device 140 supplies the timing signal. The data processing device 140 may control the operation of the gate driving device 130 using the timing signal or another control signal. If an abnormality is detected in the pixel driving device 120, the data processing device 140 may not transmit image data RGB to the pixel driving device 120 for a predetermined time or until predetermined conditions are satisfied. Even in this case, the data processing device 140 according to an embodiment may transmit a timing signal or a control signal for generating the scan signal to the gate driving device 130. A more detailed example of this will be described later.

The pixel driving device 120 may supply an analog voltage to the data line DL. The analog voltage is also referred to as a "data voltage". The analog voltage supplied to the data line DL is transferred to the pixel P connected to the data line DL according to a scan signal.

The pixel driving device 120 may receive image data RGB from the data processing device 140. The image data RGB may include pixel data for indicating grayscale values of the pixels. The pixel driving device 120 may convert the grayscale value included in the pixel data into an analog voltage, and may supply the analog voltage to the pixel.

The pixel driving device 120 may receive control data DCS from the data processing device 140. The control data DCS may include configuration values for configuring the pixel driving device 120. The pixel driving device 120 may adjust a communication speed or configure internal variables according to the configuration values.

The image data RGB and/or the control data DCS may be transmitted and received in the form of an embedded clock signal. The embedded clock signal is the signal in which data and a clock are supplied through the same signal line. The pixel driving device 120 may recover a clock from the embedded clock signal received from the data processing device 140, and may extract image data.

The pixel driving device 120 may generate the lock signal LCK when internal errors are recognized or when communication errors are recognized in the embedded clock signal. The lock signal LCK may be a kind of abnormality detection signal. The data processing device 140 may receive the lock signal LCK from the pixel driving device 120, and may recognize that the embedded clock signal is in an abnormal state.

When the data processing device 140 receives the lock signal LCK from the pixel driving device 120, the data processing device 140 may stop transmitting image data RGB and perform a procedure for restarting communication. For example, the data processing device 140 may transmit a clock training signal for training the clock to the pixel driving device 120. In addition, the data processing device 140 may transmit the embedded clock signal including configuration values for reconfiguring the pixel driving device 120.

The lock signal LCK may be transmitted and received through a signal line different from that used for the image data RGB. The line through which the embedded clock signal including image data RGB and/or control data DCS is transmitted/received may be referred to as a "main line", and the line through which the lock signal LCK is transmitted/received may be referred to as an "auxiliary line". The auxiliary line may be configured as a single line and transmit/receive information through two states of a high voltage level and a low voltage level. The auxiliary line may have a high voltage level under normal circumstances. Transmission of the lock signal LCK may indicate that the auxiliary line has a low voltage level.

Meanwhile, if noise affects the main line, the image data RGB may have an abnormal value. In addition, the pixel data included in the image data RGB may also have an abnormal grayscale value. If the pixel data has an abnormally high grayscale value, the driving current supplied to the pixel may increase, which may cause the line for supplying the driving current or peripheral elements thereof to be burnt. This phenomenon will be explained through the pixel structure of an OLED display panel.

Figure 2:
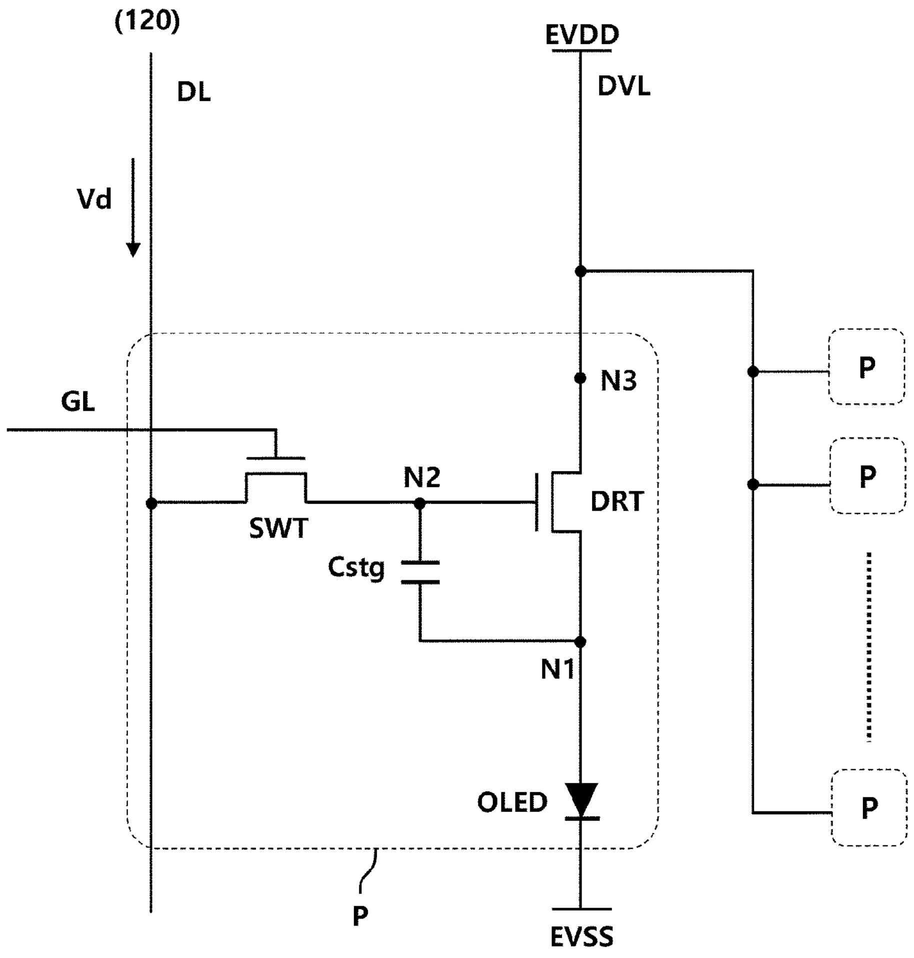
FIG. 2 is a diagram illustrating the structure of an OLED pixel according to an embodiment.

FIG. 2 is a diagram illustrating the structure of an OLED pixel according to an embodiment.

Referring to FIG. 2, the pixel P in the OLED display panel may include an organic light-emitting diode OLED, a driving transistor DRT, a switching transistor SWT, a storage capacitor Cstg, and the like.

The organic light-emitting diode OLED may be configured as an anode electrode, an organic layer, a cathode electrode, and the like. Under the control of the driving transistor DRT, the anode electrode is connected to a driving voltage EVDD, and the cathode electrode is connected to a base voltage EVSS, thereby emitting light.

The driving transistor DRT may control the brightness of the organic light-emitting diode OLED by controlling the driving current supplied to the organic light-emitting diode OLED.

A first node N1 of the driving transistor DRT may be electrically connected to the anode electrode of the organic light-emitting diode OLED, and may be a source node or a drain node. The second node N2 of the driving transistor DRT may be electrically connected to the source node or the drain node of the switching transistor SWT, and may be a gate node. A third node N3 of the driving transistor DRT may be electrically connected to a driving voltage line DVL supplying the driving voltage EVDD, and may be a drain node or a source node.

The switching transistor SWT may be electrically connected between the data line DL and the second node N2 of the driving transistor DRT and may be turned on by receiving a scan signal through the gate line GL.

When the switching transistor SWT is turned on, an analog voltage Vd supplied from the data driving circuit 120 through the data line DL is applied to the second node N2 of the driving transistor DRT.

The storage capacitor Cstg may be electrically connected between the first node N1 and the second node N2 of the driving transistor DRT.

The storage capacitor Cstg may be a parasitic capacitor existing between the first node N1 and the second node N2 of the driving transistor DRT or may be an external capacitor intentionally designed outside the driving transistor DRT.

When the analog voltage Vd is supplied to the second node N2, a gate-source voltage is formed between the second node N2 and the first node N1, and the magnitude of a driving current passing through the driving transistor DRT may be determined by the gate-source voltage. Since the storage capacitor Cstg is formed between the second node N2 and the first node N1, the gate-source voltage may be constantly maintained even if the supply of the scan signal is stopped and the switching transistor SWT is turned off. In addition, the driving current flowing from the driving voltage line DVL to the OLED may be constantly maintained according to the gate-source voltage.

If the supply of the scan signal is stopped while the gate-source voltage is configured as a voltage that induces a high driving current, the driving current flowing from the driving voltage line DVL to the OLED is maintained to be high, which may cause problems such as heating and the like.

A plurality of pixels P may be connected to one driving voltage line DVL, and if a high driving current flows to all of the plurality of pixels P, an excessive current may be concentrated on one driving voltage line DVL so that the driving voltage line DVL and/or devices therearound may be burnt. This problem, in particular, may occur in the situation of communication errors. For example, if noise occurs in the main line, a plurality pieces of pixel data included in the image data may have a high brightness grayscale value. In this case, an excessive current may be concentrated on one driving voltage line DVL, which may cause a burning phenomenon.

Figure 3:
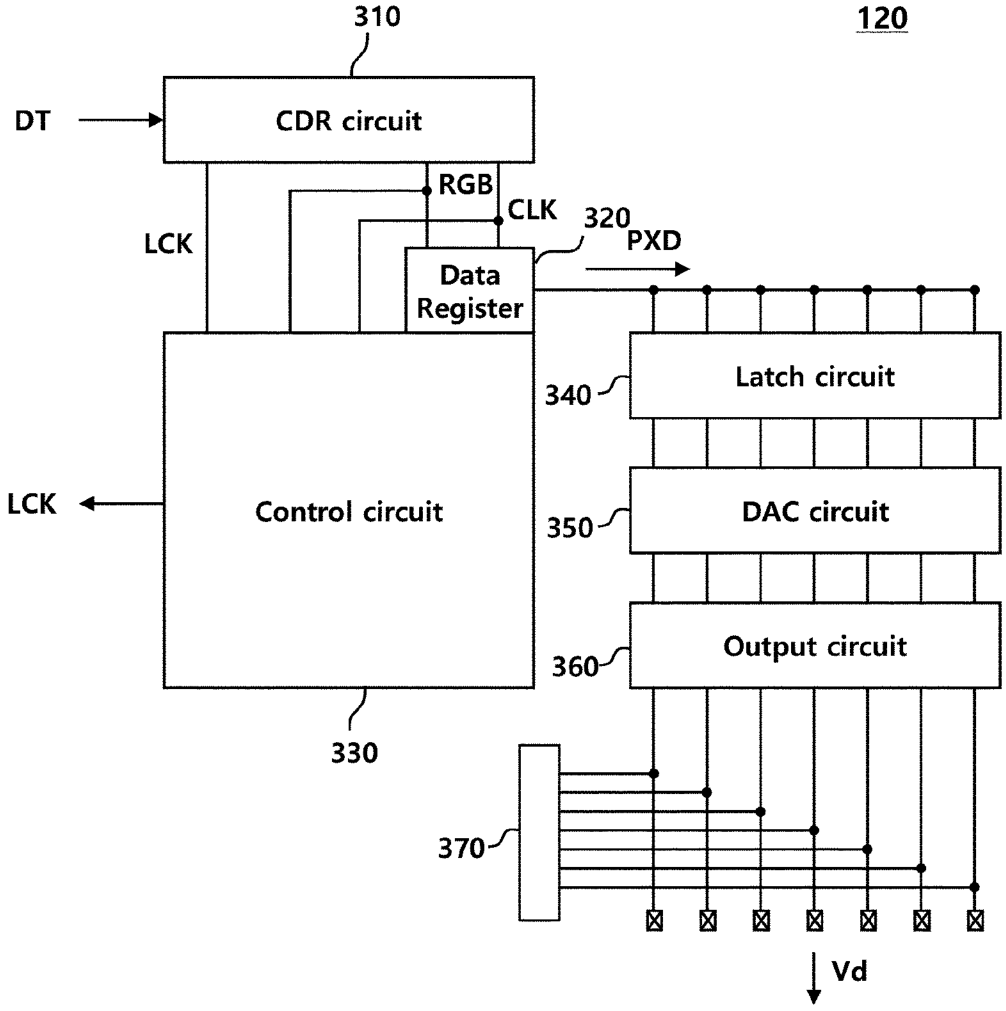
FIG. 3 is a diagram illustrating the configuration of a pixel driving device according to an embodiment.

FIG. 3 is a diagram illustrating the configuration of a pixel driving device according to an embodiment.

Referring to FIG. 3, the pixel driving device 120 may include a clock recovery circuit 310, a data register 320, a control circuit 330, a latch circuit 340, a digital-to-analog converting circuit 350, an output circuit 360, and the like.

The clock recovery circuit 310 may receive an embedded clock signal DT through the main line. In addition, the clock recovery circuit 310 may recover a clock CLK from the embedded clock signal DT. Further, the clock recovery circuit 310 may extract image data RGB and/or control data from the embedded clock signal DT using the recovered clock CLK.

The clock recovery circuit 310 may transmit the image data RGB and the clock CLK to the data register 320. The data register 320 may store pixel data PXD included in the image data RGB and sequentially transmit the pixel data PXD to the latch circuit 340 according to the clock CLK.

In addition, the digital-to-analog converting circuit 350 may convert the pixel data PXD stored in the latch circuit 340 into an analog voltage Vd.

In addition, the output circuit 360 may output the analog voltage Vd to the pixel, thereby controlling the brightness of the pixel.

The clock recovery circuit 310 may generate a lock signal LCK when an abnormality is detected in the clock CLK or the image data RGB. According to an embodiment, the lock signal LCK may also be generated in other situations. The lock signal LCK may also be generated when an internal error occurs. The lock signal LCK may be generated by a circuit other than the clock recovery circuit 310, for example, the control circuit 330. The generated lock signal LCK may be transmitted to the data processing device through the auxiliary line by the control circuit 330 or another circuit.

The control circuit 330 may receive the lock signal LCK, the image data RGB, the clock CLK, and the like from the clock recovery circuit 310 or the data register 320. In addition, the control circuit 330 may perform an overcurrent prevention function using the above signals.

As the first example, when the lock signal LCK is generated, the control circuit 330 may change the pixel data PXD such that the output circuit 360 outputs a low-brightness analog voltage that causes each pixel to emit light at low brightness.

For example, when the lock signal LCK is generated, the control circuit 330 may change the grayscale value of the pixel data PXD to a low-brightness grayscale value and then transmit the same to the latch circuit 340. In addition, the grayscale value of the pixel data PXD stored in the latch circuit 340 may be changed to a low-brightness grayscale value. The low-brightness grayscale value may be a grayscale value representing the minimum brightness. For example, the low-brightness grayscale value may be 0.

The control circuit 330 may change all of the grayscale values of the pixel data PXD, output from the data register 320 to the latch circuit 340, into low-brightness grayscale values. The control circuit 330 may transmit, to the latch circuit 340, the pixel data PXD that continues to have low-brightness grayscale values for a predetermined time after the lock signal is removed.

When the lock signal LCK is generated, the data processing device may transmit a clock training signal again according to the lock signal LCK, and the clock recovery circuit 310 may remove the lock signal LCK after retraining the clock. In addition, the control circuit 330 may control the pixel driving device 120 such that the pixel data PXD continues to have low-brightness grayscale values for a predetermined time after the lock signal LCK is removed.

As a second example, when the lock signal LCK is generated, the control circuit 330 may connect the output terminals of the output circuit 360, which are connected to the respective pixels, to a voltage source 370 that outputs a low-brightness analog voltage. The low-brightness analog voltage may correspond to the grayscale value 0, or may be lower than that.

The control circuit 330 may continuously connect the output terminals of the output circuit 360, which are connected to the respective pixels, to the voltage source 370 that outputs a low-brightness analog voltage for a predetermined time after the lock signal is removed.

As a third example, the control circuit 330 may analyze the pixel data PXD included in the image data RGB, and, if the grayscale value of the pixel data PXD is greater than a high-brightness reference value, change the pixel data PXD to a low-brightness grayscale value to then transmit the same.

If the pixel driving device 120 is able to process a first grayscale value to a $J^{th}$ grayscale value (J is a natural number of 3 or more), the high-brightness reference value may a $K^{th}$ grayscale value (K is a natural number less than J). In addition, the pixel driving device 120 may prevent a grayscale value greater than the $K^{th}$ grayscale value from being used temporarily or continuously.

The grayscale value greater than the $K^{th}$ grayscale value may be defined as a grayscale value that induces a high current. In addition, the control circuit 330 may change the grayscale value of the pixel data PXD such that the grayscale value greater than the $K^{th}$ grayscale value is not temporarily or continuously transmitted to the latch circuit 340.

First, the control circuit 330 may compare grayscale values of all pixel data PXD with the high-brightness reference value, and, if the grayscale value is greater than the high-brightness reference value, change the grayscale value of pixel data PXD to a low-brightness grayscale value. The low-brightness grayscale value may be the same as or less than the high-brightness reference value.

As another example, the control circuit 330 may compare grayscale values of the pixels with the high-brightness reference value, and, if the grayscale values of N pixels (N is a natural number) exceed the high-brightness reference value, switch its mode to a low-brightness mode.

In addition, when the control circuit switches its mode to the low-brightness mode, the output circuit 360 may output, to each pixel, the low-brightness analog voltage enabling each pixel to emit light at low brightness.

The control circuit 330 may change the grayscale value of each piece of pixel data PXD into a low-brightness grayscale value in the low-brightness mode. The low-brightness grayscale value may be a grayscale value displaying black.

When the control circuit 330 switches its mode to the low-brightness mode, the control circuit 330 may also change the value latched in the latch circuit 340, which stores the pixel data PXD for each scan line, to the low-brightness grayscale value.

The control circuit 330 may continue to change pixel data PXD of each pixel to the low-brightness grayscale value for one frame or more after switching its mode to the low-brightness mode.

When switching to the low-brightness mode, the control circuit 330 may connect the output terminal connected to each pixel to the voltage source 370 that outputs a low-brightness analog voltage. The low-brightness analog voltage may be an analog voltage displaying black.

When switching to the low-brightness mode, the control circuit 330 may generate the lock signal LCK and transmit the lock signal LCK to the data processing circuit.

Figure 4:
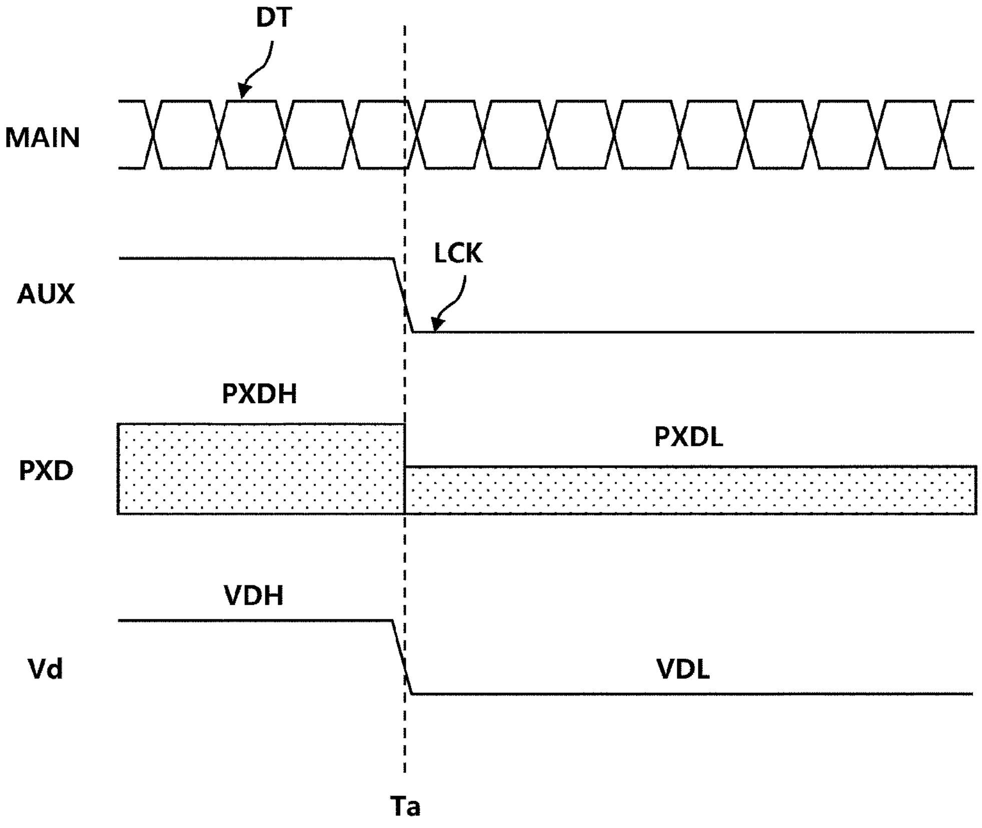
FIG. 4 is a diagram illustrating primary waveforms according to a first example.

FIG. 4 is a diagram illustrating primary waveforms according to the first example.

Referring to FIG. 4, in the first example, when an embedded clock signal DT is supplied to the main line, the pixel driving device may detect an abnormality in the embedded clock signal DT at a first time Ta and transmit a lock signal LCK through the auxiliary line.

When the lock signal LCK is generated, the pixel driving device may change the grayscale value of the pixel data PXD to a low-brightness grayscale value PXDL and transmit the same to the latch circuit. Then, the output circuit may supply a low-brightness analog voltage VDL corresponding to the low-brightness grayscale value PXDL to the pixel.

The pixel driving device may transmit the pixel data having a high-brightness grayscale value PXDH to the latch circuit depending on the abnormality in the embedded clock signal DT until the lock signal LCK is generated, and the output circuit may supply a high-brightness analog voltage VDH to the pixel. The high-brightness analog voltage VDH may increase the magnitude of the driving current supplied to the pixel and cause burning of the driving voltage line and/or devices therearound. However, as shown in the first example, when the pixel data is changed to the low-brightness grayscale value PXDL after the lock signal LCK is generated, the magnitude of the driving current may be reduced, thereby preventing the above problem.

Figure 5:
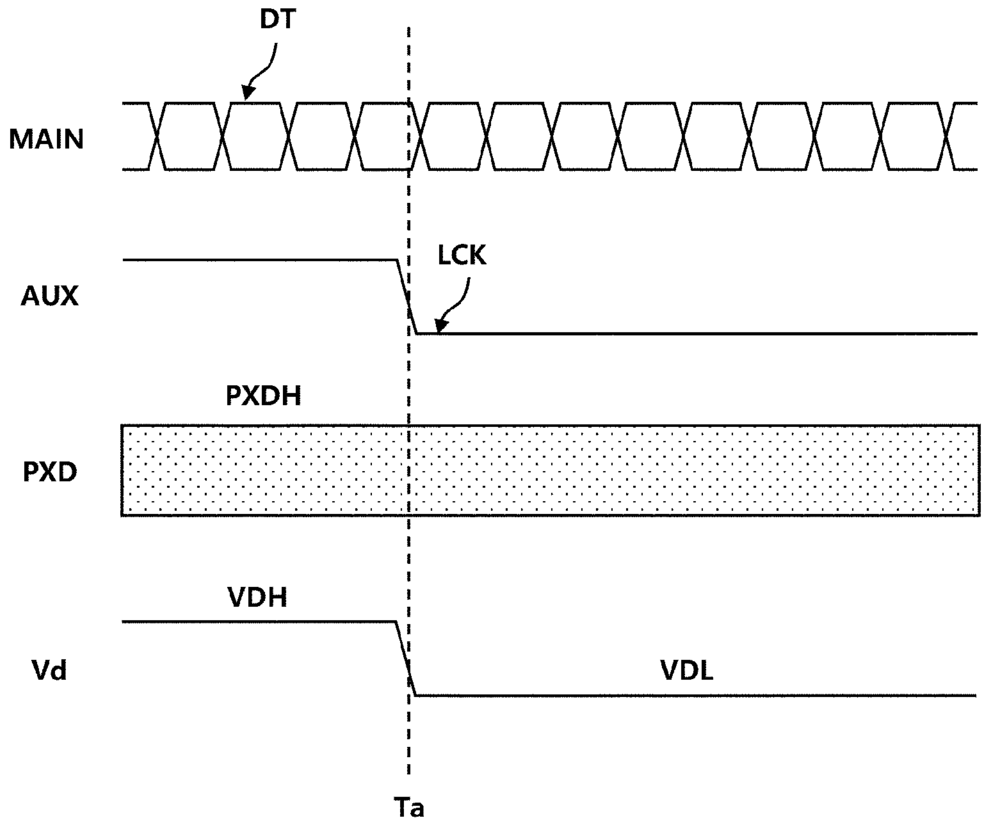
FIG. 5 is a diagram illustrating primary waveforms according to a second example.

FIG. 5 is a diagram illustrating primary waveforms according to the second example.

Referring to FIG. 5, in the second example, when the embedded clock signal DT is supplied to the main line, the pixel driving device may detect an abnormality in the embedded clock signal DT at the first time Ta and transmit a lock signal LCK through the auxiliary line.

When the lock signal LCK is generated, the pixel driving device may reduce the analog voltage output from the output circuit to the low-brightness analog voltage VDL and then supply the same to the pixel.

The second example is difference from the first example in that the pixel driving device directly controls the output circuit to reduce the analog voltage, instead of changing the grayscale value of the pixel data.

Like the first example, it is possible to solve the problem with burning by inducing a low driving current after the lock signal LCK is generated in the second example.

Figure 6:
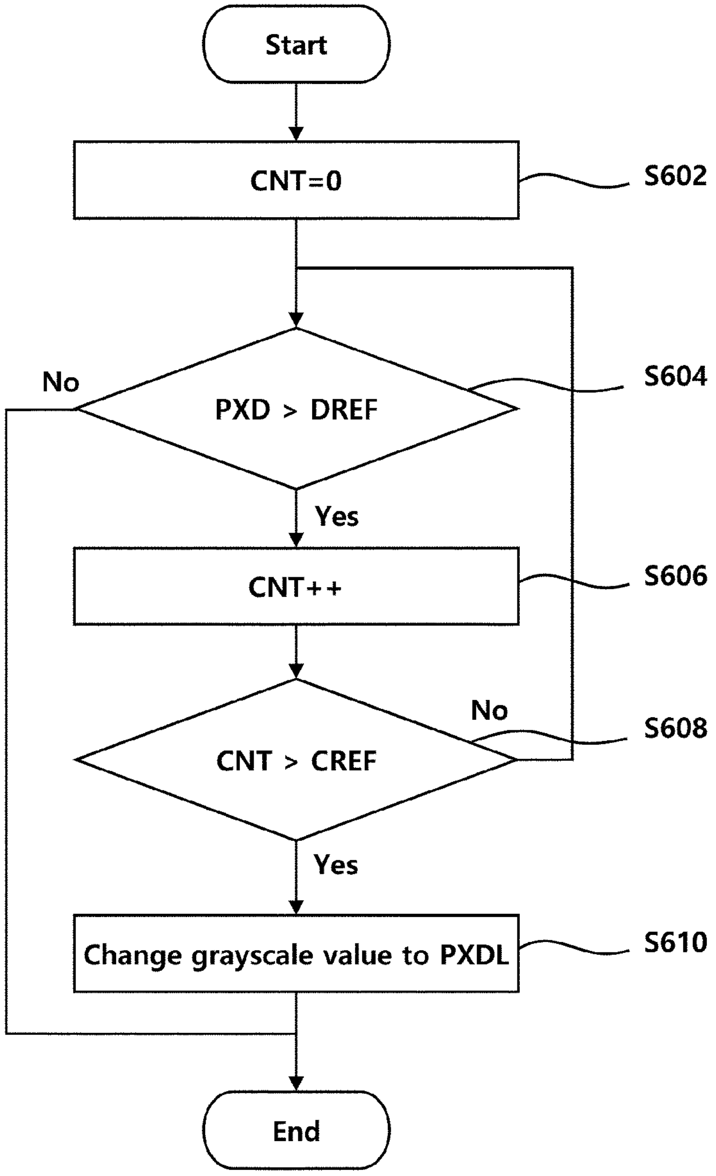
FIG. 6 is a flowchart illustrating a pixel driving method according to a third example.

FIG. 6 is a flowchart illustrating a pixel driving method according to the third example.

Referring to FIG. 6, the pixel driving device may initialize variables including a count CNT (S602).

In addition, the pixel driving device may compare grayscale values of pixel data PXD with a high-brightness reference value DREF one by one (S604), and, if the grayscale value is greater than the high-brightness reference value DREF ("Yes" in S604), increase the count CNT (S606).

In addition, the pixel driving device may compare the count value CNT with a count reference value CREF (S608), and, if the count value CNT is greater than the count reference value CREF ("Yes" in S608), may change the grayscale value of the pixel data to the low-brightness grayscale value PXDL and then transmit the same to the latch circuit (S610).

The pixel driving device may only partially change the pixel data to the low-brightness grayscale value.

Figure 7:
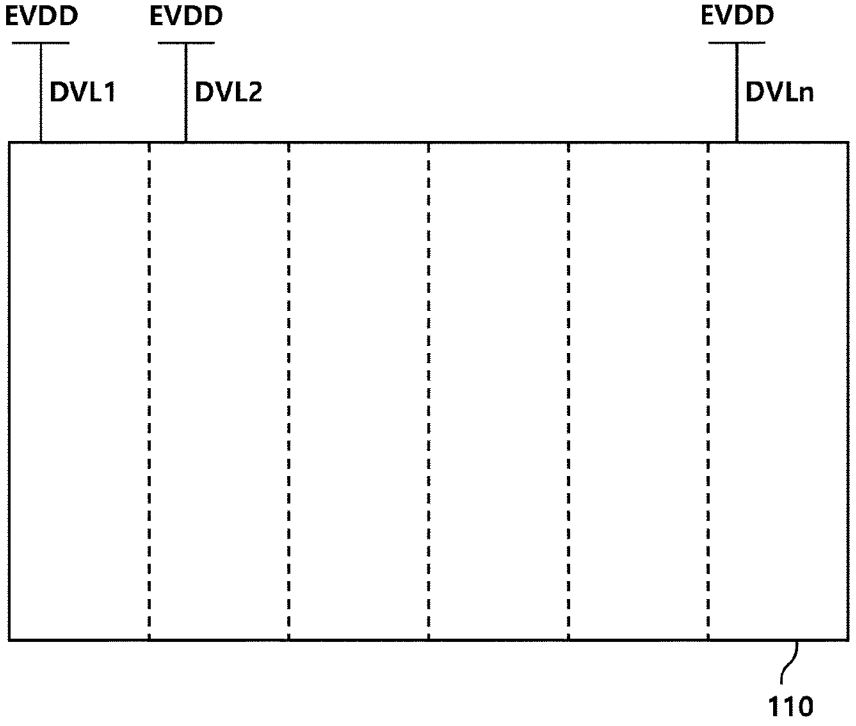
FIG. 7 is a diagram illustrating an example of partially changing pixel data.

FIG. 7 is a diagram illustrating an example of partially changing pixel data.

Referring to FIG. 7, a plurality of driving voltage lines DVL1 to DVLn may be connected to a display panel 110. In addition, each of the driving voltage lines DVL1 to DVLn may supply a driving voltage EVDD to a predetermined area of the display panel 110.

In addition, the pixel driving device may determine whether or not an overcurrent occurs in the driving voltage lines DVL1 to DVLn for each area covered by each of the driving voltage lines DVL1 to DVLn, and may change only the grayscale value of the pixel data in the area in which the overcurrent is determined to occur to the low-brightness grayscale value. For example, the pixel driving device may compare the grayscale values of the pixel data with the high-brightness reference value for the respective areas, and, if the grayscale values of a predetermined number of pixels or more exceed the high-brightness reference value in one area, may change the pixel data in the corresponding area to the low-brightness grayscale value.

As described above, according to the present embodiment, it is possible to prevent an excessive driving current from flowing due to noise and to prevent burning in the line or devices due to the excessive driving current. In addition, according to the present embodiment, it is possible to eliminate the problem with afterimages occurring in the display panel due to abnormal light emission from each pixel. Further, according to the present embodiment, it is possible to lower the visibility of image noise due to abnormal brightness.

What is claimed is:

1. A display device comprising:

a first circuit connected to a main line; and a second circuit configured to output an analog voltage corresponding to pixel data included in image data, wherein the first and second circuits are included in a source driver, in response to a change of a signal level on the main line, a first voltage which is lower than or equal to a preset value, instead of the analog voltage corresponding to the pixel data, is outputted to data lines, and the first circuit is configured to:

receive a packet including a clock signal through the main line;

recover a clock from the clock signal;

detect an abnormality using the recovered clock; and change the signal level based on the abnormality.

2. The display device of claim 1, wherein the first voltage corresponds to a grayscale value displaying black.

3. The display device of claim 1, wherein the preset value corresponds to a grayscale value displaying black.

4. The display device of claim 1, wherein the change of the signal level on the main line comprises changing from a high voltage level to a low voltage level.

5. The display device of claim 1, wherein the signal level on the main line is changed based on an abnormality in a clock or an abnormality in the image data.

6. The display device of claim 1, wherein in response to the change of the signal level on the main line, an output terminal of the second circuit is connected to a line corresponding to the first voltage.

7. The display device of claim 1, further comprising:

a third circuit configured to change the pixel data to data corresponding to the first voltage, in response to the change of the signal level on the main line.

8. The display device of claim 1, wherein in response to the change of the signal level on the main line, the second circuit is configured to output the first voltage during a preset period, and the preset period is longer than a period corresponding to a frame.

9. The display device of claim 1, wherein the first circuit is configured to:

transmit a signal having the changed signal level to a third circuit included in the source driver.

10. The display device of claim 9, wherein the source driver further comprises a latch circuit and a digital-to-analog (DAC) conversion circuit, the third circuit is configured to change the pixel data and transmit the changed pixel data to the latch circuit, the DAC conversion circuit is configured to convert the changed pixel data into an analog voltage and transmit, to the second circuit, the analog voltage, and the second circuit is configured to output the first voltage based on receiving the analog voltage.

11. The display device of claim 9, wherein the third circuit is configured to connect output terminals of the second circuit to a voltage source that is configured to output the first voltage, and the voltage source is different from the first, second, and third circuits.

12. A method for driving a display device, the method comprising:

obtaining, by a first circuit, image data comprising pixel data;

outputting, by a second circuit, an analog voltage corresponding to the pixel data included in the image data; and in response to a change of a signal level on a main line, outputting a first voltage which is lower than or equal to a preset value, instead of the analog voltage corresponding to the pixel data, wherein the first and second circuits are included in a source driver, and the method further comprises:

receiving, by the first circuit, a packet including a clock signal through the main line;

recovering, by the first circuit, a clock from the clock signal;

detecting, by the first circuit, an abnormality using the recovered clock; and changing, by the first circuit, the signal level based on detecting the abnormality.

13. The method of claim 12, wherein the preset value corresponds to a grayscale value displaying black.

14. The method of claim 12, wherein the signal level on the main line is changed based on an abnormality in a clock or an abnormality in the image data.

15. The method of claim 12, wherein the first voltage is outputted from a circuit connected to a line corresponding to the first voltage.

16. The method of claim 12, further comprising:

changing the pixel data to data corresponding to the first voltage, in response to the change of the signal level on the main line.

17. The method of claim 12, comprising outputting the first voltage during a preset period, in response to the change of the signal level on the main line, wherein the preset period is longer than a period corresponding to a frame.

18. The method of claim 12, wherein the method further comprises:

the first circuit transmitting a signal having the changed signal level to a third circuit included in the source driver.

19. The method of claim 18, wherein the source driver further comprises a latch circuit and a digital-to-analog (DAC) conversion circuit, and the method further comprises:

the third circuit changing the pixel data and transmit the changed pixel data to the latch circuit, the DAC conversion circuit converting the changed pixel data into an analog voltage and transmit, to the second circuit, the analog voltage, and the second circuit outputting the first voltage based on receiving the analog voltage.

20. The method of claim 18, wherein the method further comprises connecting output terminals of the second circuit to a voltage source that is configured to output the first voltage, and the voltage source is different from the first, second, and third circuits.

* * * * *